United States Patent

Reed et al.

[11] Patent Number: 6,061,739
[45] Date of Patent: May 9, 2000

[54] NETWORK ADDRESS ASSIGNMENT USING PHYSICAL ADDRESS RESOLUTION PROTOCOLS

[75] Inventors: Benjamin Clay Reed, San Jose; Steven R. Welch, Gilroy, both of Calif.

[73] Assignee: International Business Machines Corp., Armonk, N.Y.

[21] Appl. No.: 08/979,141

[22] Filed: Nov. 26, 1997

[51] Int. Cl.[7] .................................................. H04L 12/00
[52] U.S. Cl. .................... 709/245; 709/222; 709/225; 709/228; 370/447; 370/471
[58] Field of Search .................. 395/200.75, 200.52; 370/447, 471; 709/9, 222, 245, 225, 228, 231

[56] References Cited

U.S. PATENT DOCUMENTS

| | | | |
|---|---|---|---|
| 4,551,721 | 11/1985 | Kozlik | 370/452 |
| 4,689,786 | 8/1987 | Sidhu et al. | 370/431 |
| 4,727,475 | 2/1988 | Kiremidjian | 710/104 |
| 4,773,005 | 9/1988 | Sullivan | 710/9 |
| 5,150,464 | 9/1992 | Sidhu et al. | 709/222 |
| 5,166,931 | 11/1992 | Riddle | 370/401 |
| 5,237,614 | 8/1993 | Weiss | 380/23 |
| 5,287,103 | 2/1994 | Kasprzyk et al. | 370/351 |
| 5,355,375 | 10/1994 | Christensen | 370/407 |
| 5,434,918 | 7/1995 | Kung et al. | 380/25 |
| 5,446,897 | 8/1995 | Mathias et al. | 395/200.52 |
| 5,465,330 | 11/1995 | Komatsu et al. | 709/222 |
| 5,524,052 | 6/1996 | Augustine et al. | 380/49 |
| 5,526,489 | 6/1996 | Nilakantan et al. | 709/228 |
| 5,535,336 | 7/1996 | Smith et al. | 709/225 |
| 5,550,984 | 8/1996 | Gelb | 709/245 |
| 5,617,540 | 4/1997 | Civanlar et al. | 709/221 |
| 5,668,952 | 9/1997 | Slane | 395/200.75 |
| 5,781,552 | 3/1995 | Hashimoto | 370/447 |
| 5,854,901 | 7/1996 | Cole et al. | 395/200.75 |

OTHER PUBLICATIONS

Manual, Bootstrap and Autoconfiguration (BOOTP, DHCP), Chapter 21, pp. 365–379, Mar. 1995.

R. Droms, Memorandum re:Dynamic Host Configuration Protocol, Bucknell University, Mar. 1997, (pp. 1–45).

Finlayson, et al., Memorandum re: A Reverse Address Resolution Protocol, Stanford University, Jun. 1984, (pp. 1–4).

Bill Croft et al., Memorandum re: Bootstrap Protocol (BOOTP), Sep. 1985, (pp.1–12).

David C. Plummer, paper entitled An Ethernet Address Resolution Protocol or Converting Network Protocol . . . Ethernet Hardware, Nov. 1982, (8pp).

*Primary Examiner*—Ellis B. Ramirez
*Assistant Examiner*—Chuong Ho
*Attorney, Agent, or Firm*—Merchant & Gould P.C.

[57] ABSTRACT

A method, apparatus, and article of manufacture for initial network address configuration using physical address resolution protocol. A device attempts a connection to the network, which causes address resolution (ARP) packets to be generated. The device monitors communications on the network for a specified number of unanswered ARP packets. Thereafter, the device adopt the network address in the unanswered ARP packets and responds to the unanswered ARP packets with the its' physical address.

21 Claims, 2 Drawing Sheets

NETWORK ADDRESS ASSIGNMENT USING PHYSICAL ADDRESS RESOLUTION PROTOCOLS

BACKGROUND OF THE INVENTION

1. Field of the Invention

The present invention relates to address resolution protocols for devices in communication networks, and more particularly, to systems that assign a network address using a physical address resolution protocol.

2. Description of Related Art

Transmission Control Protocol/Internet Protocol (TCP/IP) is a widely accepted international standard for describing communications on the Internet. In TCP/IP, network communications are divided into 4 layers, including application, transport, internet, and host-to-network layers.

An IP address is assigned to each host system or device operating within the Internet. The IP address includes a network address portion and a host address portion. The network address portion identifies a network within which the system resides, and the host address portion uniquely identifies the system in that network.

The combination of network address and host address is unique, so that no two systems have the same IP address. All IP addresses are 32 bits long and are usually written in dotted decimal notation, e.g., 255.255.255.255. These IP addresses are then used in the source address and destination address fields of IP packets.

In many cases, the network number in the IP address refers to a network on the Internet, such as a local area network (LAN), Internet Service Provider (ISP), intranet, etc. These networks may communicate with systems therein using other access protocols, such as Ethernet (IEEE Standard 802.3), dialup point-of-presence (POP), etc. These access protocols are typically broken down into the data link layer and physical layer, with the data link layer being further broken down into a media access control (MAC) layer and a logical link layer.

Systems such as personal computers, workstations, minicomputers, and mainframe computers attached to the networks each have a distinct lower level protocol identifier known as the physical network address or MAC address. Data forwarded to a destination system on the network under these lower level protocols contain the destination system MAC address, or other physical network address, as a destination address. Data forwarded from a source system on the network contain the source system MAC address, or other physical network address, as a source address. These systems thus communicate by encapsulating additional protocols within the lower layer protocols.

Systems routing data in an IP network rely on the network address portion of the IP address in a packet to find the network of the destination system. Once the network of the destination is located, the data is forwarded to that network and the host address portion is relied upon by the network to assign a MAC address for the destination system.

In order to communicate in this system, a network must first obtain its network address. Network numbers are assigned by the InterNIC (Internet Network Information Center) to avoid conflicts. Further, every system or device in a network must be assigned its own unique host address. Host addresses are usually assigned by network administrators and manually configured by a technician. Generally, the host addresses are associated with a hardware address for the system, such as an Ethernet address.

Every system or device that interfaces to a network usually has a unique hardware address. The hardware address is not location dependent and is globally unique. In general, the hardware address is set when a network interface is fabricated. Thus, when a network device (with network address x) wants to talk to another device (with network address y), the network device x must resolve network address y to a hardware address. The hardware address may be the address of the network interface card of device y or it may be the hardware address of the network interface of a gateway connecting device x to device y.

When a new system or device is initially attached to a network, that device must be given an IP address that maps to its unique hardware address. For systems or devices with consoles, the IP address can be keyed into a configuration screen. Systems or devices without consoles often have a serial port for attaching a terminal to perform this configuration operation. Alternatively, protocols exist that allow the new device to determine its IP address.

An Address Resolution Protocol (ARP), defined in RFC 826, provides a mechanism for determining IP addresses. For example, a first host having Ethernet address E1 broadcasts a packet onto an Ethernet LAN requesting a hardware address associated with an IP address. The broadcast is received by every system on the Ethernet LAN and each one checks its IP address for a match. When a second host at Ethernet address E2 identifies the IP address as its own, it responds to the broadcast with its Ethernet address E2. In this way, the first host learns that the requested IP address is associated with the second host having Ethernet address E2.

Various optimizations are possible to make ARP more efficient. To start with, once a system has run ARP, it may cache the result in case it needs to contact the same system shortly. Next time, it will find the mapping in its own cache, thus eliminating the need for a second broadcast.

Yet another optimization is to have every system broadcast its mapping when it boots. This broadcast is generally done in the form of an ARP looking for its own IP address. There should not be a response, but a side effect of the broadcast is to make any entry in every system's ARP cache. If a response does arrive, two systems have been assigned the same IP address, so the broadcasting system should inform the system manager and not complete its boot operation.

ARP solves the problem of finding out which Ethernet address corresponds to a given IP address. However, sometimes the reverse problem needs to be solved, i.e., given an Ethernet address, determining the corresponding IP address.

A reverse address resolution protocol (RARP), defined in RFC 903, has been developed to identify Ethernet addresses associated with IP addresses. As a result, the RARP allows a system without a configured IP address to obtain an IP address from a remote server. The system broadcasts a request and waits until a RARP server responds. In the request, the system must provide its physical network address (MAC address) to uniquely identify itself, allowing the server to map it into an IP address.

For example, the protocol allows a newly-booted system to broadcast its Ethernet address and request the corresponding IP address in response. The RARP server sees this request, looks up the Ethernet address in its configuration files, and sends back the corresponding IP address.

Using RARP is better than embedding an IP address in the memory image of the device, because it allows the same memory image to be used on all devices. If the IP address were buried inside the memory image, each device would need its own unique memory image.

The RARP protocol works fine, so long as a RARP server is available and is aware of the physical network address of the devices being added to the network. In order to find out the physical network address, all of the systems being added to the network must be passed through the RARP server, so that the address can be read from these systems, or a local technician must read the physical network address from the system and manually update the RARP server.

This process makes connecting a new device to a network difficult. Further, this process of physically reading the physical network address from the box is prone to human errors. Such addresses are typically very long (Ethernet MAC addresses are 48 bits long), and can be misread or typed in erroneously.

Another disadvantage of RARP is that it uses a destination address of all 1's (limited broadcasting) to reach the RARP server. However, such broadcasts are not forwarded by routers, so a RARP server is needed on each network.

To get around the problems associated with RARP, an alternative bootstrap protocol (BOOTP) has been developed, which is defined in RFCs 951, 1048, and 1084. Unlike RARP, BOOTP uses user datagram protocol (UDP) messages for connectionless transmission, which are forwarded over routers. It also provides a system with additional information, including the IP address of the file server holding the memory image, the IP address of the default router, and the subnet mask to use.

The Dynamic Host Configuration Protocol (DFCP) extends BOOTP in two ways. First, DHCP allows a system to acquire all the configuration information it needs in a single message. For example, in addition to an IP address, a DHCP message can contain a subnet mask. Second, DHCP provides a dynamic address allocation mechanism. Whenever a new device connects to the network, it contacts a DHCP server that maintains a set of IP addresses. The DHCP server chooses one of the addresses and then allocates the address to the device.

Notwithstanding these various techniques for assigning IP addresses to devices, there is still a need in the art for simplified mechanism for assigning IP addresses to devices. Moreover, there is a need in the art for techniques that can be performed by unskilled personnel. In addition, there is a need in the art for techniques that can be performed automatically without human intervention.

SUMMARY OF THE INVENTION

To minimize the limitations in the prior art described above, and to minimize other limitations that will become apparent upon reading and understanding the present specification, the present invention discloses a method, apparatus, and article of manufacture for initial network address configuration using physical address resolution protocol. A device attempts a connection to the network, which causes address resolution (ARP) packets to be generated. The device monitors communications on the network for a specified number of unanswered ARP packets. Thereafter, the device adopts the network address in the unanswered ARP packets and responds to the unanswered ARP packets with the its' physical address.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention comprises a method for assigning a network address to a new device coupled to a network without any additional infrastructure or pre-existing knowledge of the hardware address of the device. After the device is attached to the network, it attempts to establish a connection on the network, which causes address resolution protocol (ARP) requests to be generated. The device monitors the communications on the network for unanswered ARP requests. When it sees N unanswered ARP requests (where N is a preset threshold) in a given length of time, the device adopts the requested network address and responds to the ARP with its hardware address.

Since the ARP is caused by a network connection attempt by the device itself, if the connection attempt does not succeed within a specified period of time, the ARP should not have been answered by the device. In this situation, the device broadcasts an ARP request for the network address it has adopted and starts monitoring for unanswered ARPs again. These steps are repeated until the device is configured with a correct IP address.

Hardware Environment

Figure 1:
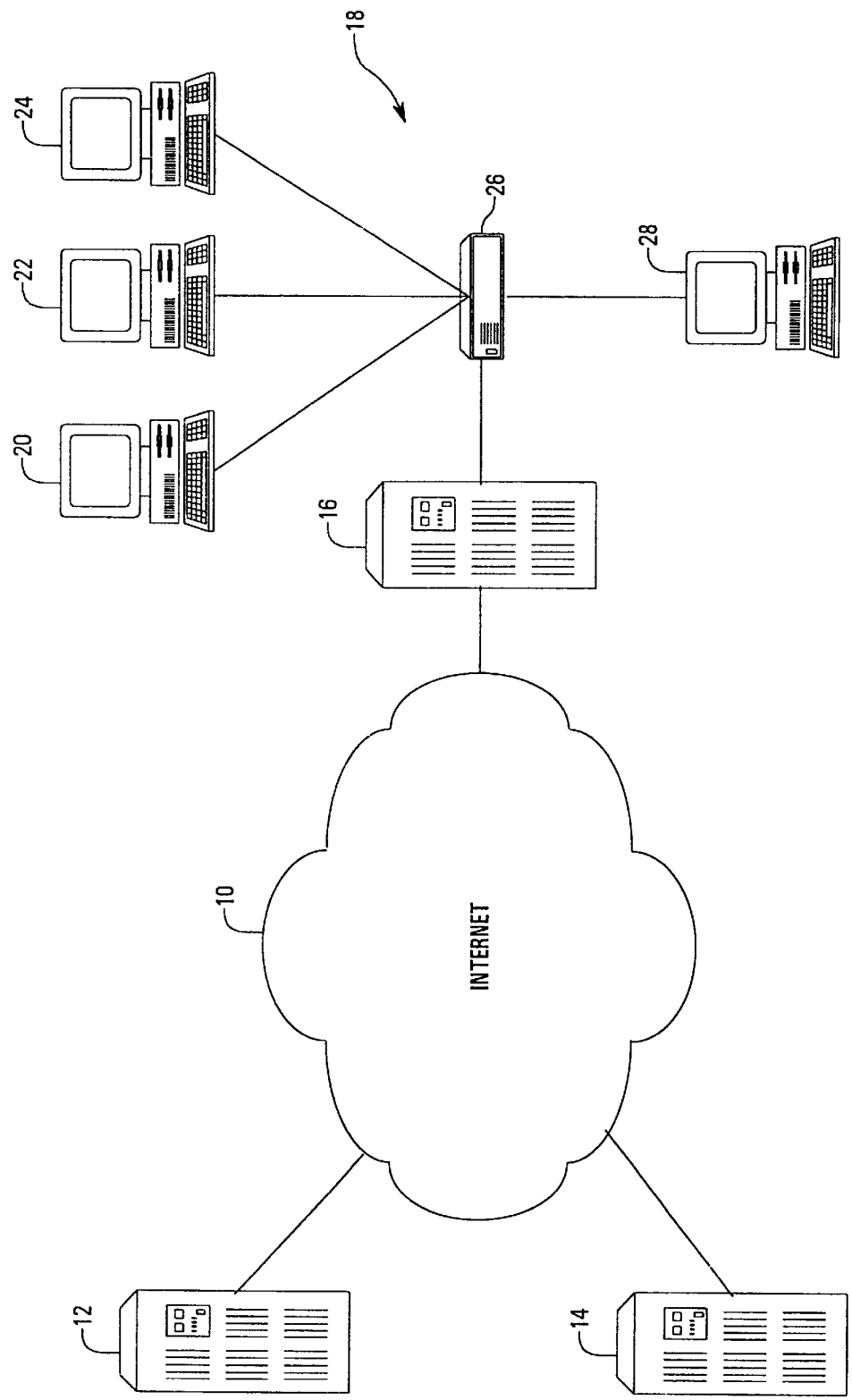
FIG. 1 is a block diagram of an exemplary hardware environment of the preferred embodiment of the present invention, and more particularly, illustrates a typical configuration for the Internet.

FIG. 1 is a block diagram of an exemplary hardware environment of the preferred embodiment of the present invention, and more particularly, illustrates a typical configuration for the Internet 10. A plurality of servers 12, 14, and 16 are connected to the Internet 10. An expanded view is provided of an Ethernet LAN 18 managed by one of the servers 16. One of the servers 16 manages an Ethernet LAN 18, wherein clients 20, 22, and 24 are connected to the server 16 via an Ethernet hub 26. In an exemplary embodiment, client 28 is a new device connected to the LAN 18 and must be configured with an IP address once it is connected to the Ethernet hub 26.

The servers 12, 14, and 16 and clients 20, 22, and 24 may comprise any device capable of being connected to a network. Generally these devices include, inter alia, a processor, random access memory (RAM), data storage devices, data communications devices, monitor, user input devices, etc. Those skilled in the art will recognize that any combination of the above components, or any number of different components, peripherals, and other devices, may be used without departing from the scope of the present invention.

The present invention is usually (although not necessarily) implemented by programming or logic embodied, executed, interpreted, and/or stored within the client 28. Thus, the present invention may be implemented as a method, apparatus, or article of manufacture using standard programming and/or engineering techniques to produce software, firmware, hardware, or any combination thereof. The term "article of manufacture" as used herein is intended to encompass any programming or logic embodied, executed, interpreted, and/or stored within any device, carrier, or media.

Those skilled in the art will recognize that the exemplary environment illustrated in FIG. 1 is not intended to limit the present invention. Indeed, those skilled in the art will recognize that other alternative hardware environments may be used without departing from the scope of the present invention. For example, this invention is applicable to any type of network, configuration of devices, communications media, and is not limited to the networks, devices, and media shown in FIG. 1.

Flowchart

Figure 2:
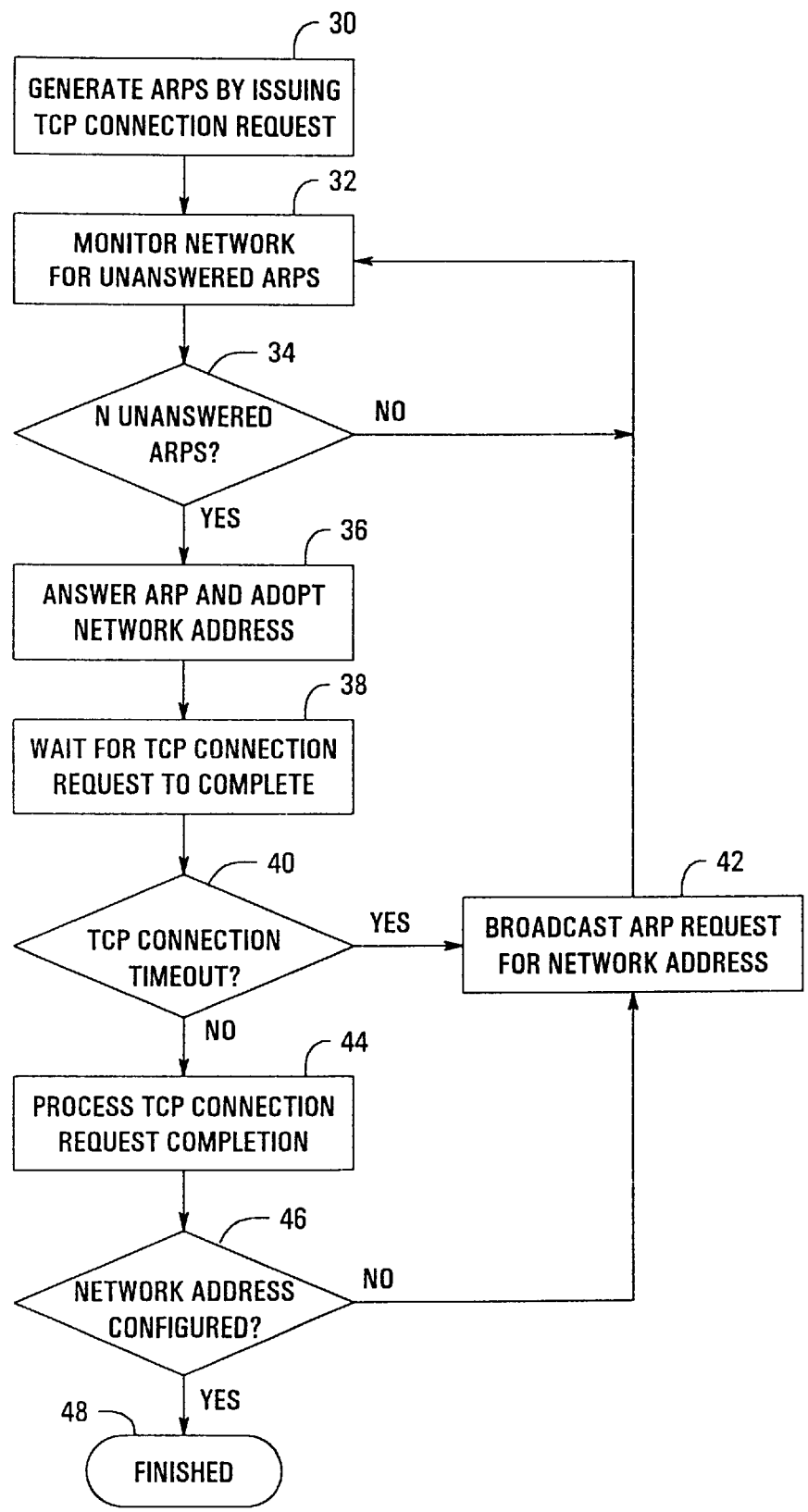
FIG. 2 is a flowchart that illustrates a state diagram of the logic performed by a device for network address assignment using physical address resolution protocols.

FIG. 2 is a flowchart that illustrates a state diagram of the logic performed by a device for network address assignment using physical address resolution protocols.

Initially, the device does not have a network address and Block 30 represents the device generating an ARP packet, for example, by issuing a TCP connection request.

Block 32 represents the device monitoring communications on the network for unanswered ARPs.

Block 34 is a decision block that represents the device determining whether N unanswered ARP requests have been observed in a first specified time interval, wherein both N and the first specified time interval are programmable values. If so, control transfers to Block 36; otherwise, control transfers to Block 32.

Block 36 represents the device answering the ARP requests with its own hardware address and adopting the network address specified in the ARP requests.

Block 38 represents the device waiting for completion of the previously-issued TCP connection request.

Block 40 is a decision block that represents the device determining whether the TCP connection request completed within a second specified time interval, wherein the second specified time interval is a programmable value. If not, control transfers to Block 42; otherwise, control transfers to Block 44.

Block 42 represents the device broadcasting an ARP request for the network address adopted by the device and associated with the device's hardware address, wherein the broadcast clears the ARP caches of the other devices on the network for this network address.

Block 44 represents the device processing the TCP connection by adopting the network address.

Block 46 is a decision block that represents the device determining whether the request configured the device's network address. If so, control transfers to Block 48, which represents the completion of the process; otherwise, control transfers to Block 42.

Conclusion

This concludes the description of the preferred embodiment of the invention. The following paragraphs describe some alternative methods of accomplishing the same objects.

The systems or devices being attached to the networks and being assigned IP addresses may include personal computers, workstations, minicomputers, mainframes, hubs, printers, or any other network-aware devices, etc. Indeed, any device that may be connected to a network would benefit from the present invention.

The present invention is not restricted to TCP/IP networks such as the Internet. Instead, the present invention would be applicable to intra-nets, LANs, WANs, SNA networks, or any other network.

In conclusion, the present invention discloses a method, apparatus, and article of manufacture for initial network address configuration using physical address resolution protocol. A device attempts a connection to the network, which causes address resolution (ARP) packets to be generated. The device monitors communications on the network for a specified number of unanswered ARP packets. Thereafter, the device adopt the network address in the unanswered ARP packets and responds to the unanswered ARP packets with its' physical address.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of assigning a network address to a device coupled to the network using a physical address resolution protocol, comprising the steps of:
   (a) monitoring communications on the network to observe unanswered address solution protocol (ARP) packets therein;
   (b) adopting the network address in the unanswered ARP packets after a specified number of unanswered ARP packets have been observed, wherein the specified number of unanswered address solution protocol (ARP) packets is a programmable value; and
   (c) responding to the unanswered ARP packets with the device's physical address after the network address has been adopted.

2. The method of claim 1 above, wherein the monitoring step further comprises the step of monitoring communications on the network for the specified number of unanswered ARP packets in a given length of time.

3. The method of claim 2 above, wherein the given length of time is a programmable value.

4. The method of claim 1 above, further comprising the step of generating the ARP packets by attempting a connection to the network from the device.

5. The method of claim 4 above, further comprising the step of dropping the adopted network address when the attempt connection to the network from the device fails in a given length of time.

6. The method of claim 5 above, wherein the given length of time is a programmable value.

7. The method of claim 5 above, further comprising the step of repeating the generating, monitoring, adopting and responding steps when the adopted network address is dropped.

8. An apparatus for assigning a network address using a physical address resolution protocol, comprising:
   a device, coupled to a network, wherein the device monitors communications on the network to observe unanswered address solution protocol (ARP) packets therein, adopts the network address in the unanswered ARP packets after a specified number of unanswered ARP packets have been observed, wherein the specified number of unanswered address solution protocol (ARP) packets is a programmable value, and responds to the unanswered ARP packets with the device's physical address after the network address has been adopted.

9. The apparatus of claim 8 above, wherein the device monitors communications on the network for the specified number of unanswered ARP packets in a given length of time.

10. The apparatus of claim 9 above, wherein the given length of time is a programmable value.

11. The apparatus of claim 8 above, wherein the device generates the ARP packets by attempting a connection to the network from the device.

12. The apparatus of claim 11 above, wherein the device drops the adopted network address when the attempt connection to the network from the new device fails in a given length of time.

13. The apparatus of claim 12 above, wherein the given length of time is a programmable value.

14. The apparatus of claim 12 above, wherein the device repeats the generating, monitoring, adopting and responding functions when the adopted network address is dropped.

15. An article of manufacture comprising a carrier embodying logic that causes a device connected to a network to perform a method for assigning a network address to the device using a physical address resolution protocol, the method comprising the steps of:

(a) monitoring communications on the network to observe unanswered address solution protocol (ARP) packets therein;

(b) adopting the network address in the unanswered ARP packets after a specified number of unanswered ARP packets have been observed, wherein the specified number of unanswered address solution protocol (ARP) packets is a programmable value; and (c) responding to the unanswered ARP packets with the device's physical address after the network address has been adopted.

16. The article of manufacture of claim 15 above, wherein the monitoring step further comprises the step of monitoring communications on the network for the specified number of unanswered ARP packets in a given length of time.

17. The article of manufacture of claim 16 above, wherein the given length of time is a programmable value.

18. The article of manufacture of claim 15 above, further comprising the step of generating the ARP packets by attempting a connection to the network from the device.

19. The article of manufacture of claim 18 above, further comprising the step of dropping the adopted network address when the attempt connection to the network from the device fails in a given length of time.

20. The article of manufacture of claim 19 above, wherein the given length of time is a programmable value.

21. The article of manufacture of claim 19 above, further comprising the step of repeating the generating, monitoring, adopting and responding steps when the adopted network address is dropped.

* * * * *